(12) United States Patent
Zimmer

(10) Patent No.: US 8,130,237 B2
(45) Date of Patent: Mar. 6, 2012

(54) RESOLUTION INDEPENDENT USER INTERFACE DESIGN

(75) Inventor: Mark Zimmer, Aptos, CA (US)

(73) Assignee: Apple Inc., Cupertino, CA (US)

( * ) Notice: Subject to any disclaimer, the term of this patent is extended or adjusted under 35 U.S.C. 154(b) by 752 days.

(21) Appl. No.: 11/459,140

(22) Filed: Jul. 21, 2006

(65) Prior Publication Data

US 2006/0284878 A1  Dec. 21, 2006

Related U.S. Application Data

(63) Continuation-in-part of application No. 10/876,298, filed on Jun. 24, 2004.

(51) Int. Cl.
  *G09G 5/00* (2006.01)
(52) U.S. Cl. ........ 345/619; 345/581; 345/582; 345/473; 345/474; 345/156; 345/158; 345/419; 715/744; 715/765; 715/800; 715/718
(58) Field of Classification Search .................. 345/619, 345/473–474, 581, 582, 156, 158, 419; 715/718, 715/744, 765, 800
See application file for complete search history.

(56) References Cited

U.S. PATENT DOCUMENTS 5,297,250 A  3/1994  Leroy et al.
(Continued)

FOREIGN PATENT DOCUMENTS

EP  548586  6/1993
(Continued)

OTHER PUBLICATIONS

Akeley, et al. "Real-Time Graphics Architecture" http://www.graphics.stanford.edu/courses/cs448a-01-fall, The OpenGL® Graphics System—CS448 Lecture 15, Fall 2001, pp. 1-20.

(Continued)

*Primary Examiner* — Jin-Cheng Wang
(74) *Attorney, Agent, or Firm* — Wong, Cabello, Lutsch, Rutherford & Brucculeri, LLP

(57) ABSTRACT

Graphical user interface material map objects are specified by a collection of attribute-value pairs, the collection of which comprises a complete description of the material map and may be used by a rendering engine to create a visual representation of the material map at any resolution. That is, material map representations in accordance with the invention are resolution independent. Another benefit of representing material maps in accordance with the invention is that they may be encrypted to prevent unauthorized inspection or use.

21 Claims, 10 Drawing Sheets

U.S. PATENT DOCUMENTS

| | | | |
|---|---|---|---|
| 5,357,603 A | 10/1994 | Parker | |
| 5,388,201 A | 2/1995 | Hourvitz et al. | |
| 5,471,572 A | 11/1995 | Buchner et al. | |
| 5,481,665 A | 1/1996 | Okada et al. | |
| 5,490,246 A | 2/1996 | Brotsky et al. | |
| 5,537,630 A | 7/1996 | Berry et al. | |
| 5,632,033 A * | 5/1997 | Guillen et al. | 719/329 |
| 5,651,107 A | 7/1997 | Frank et al. | |
| 5,764,229 A | 6/1998 | Bennett | |
| 5,793,376 A | 11/1998 | Tanaka et al. | |
| 5,877,741 A | 3/1999 | Chee et al. | |
| 5,877,762 A | 3/1999 | Young | |
| 5,933,148 A | 8/1999 | Oka et al. | |
| 5,949,409 A | 9/1999 | Tanaka et al. | |
| 6,006,231 A | 12/1999 | Popa | |
| 6,031,937 A | 2/2000 | Graffagnino | |
| 6,075,543 A | 6/2000 | Akeley | |
| 6,166,748 A | 12/2000 | Van Hook et al. | |
| 6,211,890 B1 | 4/2001 | Ohba | |
| 6,246,418 B1 | 6/2001 | Oka | |
| 6,272,558 B1 | 8/2001 | Hui et al. | |
| 6,307,574 B1 | 10/2001 | Ashe et al. | |
| 6,313,851 B1 * | 11/2001 | Matthews et al. | 715/718 |
| 6,369,823 B2 | 4/2002 | Ohba | |
| 6,369,830 B1 | 4/2002 | Brunner et al. | |
| 6,411,301 B1 | 6/2002 | Parikh et al. | |
| 6,421,058 B2 | 7/2002 | Parikh et al. | |
| 6,424,348 B2 | 7/2002 | Parikh | |
| 6,452,600 B1 | 9/2002 | Parikh et al. | |
| 6,456,290 B2 | 9/2002 | Parikh et al. | |
| 6,466,218 B2 | 10/2002 | Parikh et al. | |
| 6,483,524 B1 | 11/2002 | Petenkine et al. | |
| 6,489,963 B2 | 12/2002 | Parikh et al. | |
| 6,526,174 B1 | 2/2003 | Graffagnino | |
| 6,542,160 B1 | 4/2003 | Abgrall | |
| 6,571,328 B2 | 5/2003 | Liao et al. | |
| 6,577,317 B1 | 6/2003 | Duluk, Jr. et al. | |
| 6,580,430 B1 | 6/2003 | Hollis et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,664,958 B1 | 12/2003 | Leather et al. | |
| 6,664,962 B1 | 12/2003 | Komsthoeft et al. | |
| 6,697,074 B2 | 2/2004 | Parikh et al. | |
| 6,707,462 B1 | 3/2004 | Peercy et al. | |
| 6,717,599 B1 | 4/2004 | Olano | |
| 6,734,864 B2 | 5/2004 | Abgrall | |
| 6,906,720 B2 | 6/2005 | Emberling et al. | |
| 6,911,984 B2 | 6/2005 | Sabella et al. | |
| 6,982,695 B1 * | 1/2006 | Canova et al. | 345/156 |
| 7,136,790 B1 * | 11/2006 | Hobbs et al. | 703/6 |
| 7,167,173 B2 * | 1/2007 | Balmelli et al. | 345/419 |
| 7,590,947 B1 * | 9/2009 | Gay et al. | 715/800 |
| 7,675,529 B1 * | 3/2010 | Brunner et al. | 345/661 |
| 2002/0067418 A1 | 6/2002 | Hiroaki | |
| 2002/0093516 A1 | 7/2002 | Brunner et al. | |
| 2002/0093538 A1 * | 7/2002 | Carlin | 345/778 |
| 2002/0118217 A1 | 8/2002 | Fujiki | |
| 2002/0147729 A1 * | 10/2002 | Balfour | 707/104.1 |
| 2002/0171682 A1 | 11/2002 | Frank et al. | |
| 2002/0174181 A1 | 11/2002 | Wei | |
| 2003/0058487 A1 * | 3/2003 | Lay | 358/506 |
| 2003/0123739 A1 | 7/2003 | Graffagnino | |
| 2003/0146934 A1 | 8/2003 | Bailey et al. | |
| 2003/0174136 A1 | 9/2003 | Emberling et al. | |
| 2003/0234799 A1 * | 12/2003 | Lee | 345/660 |
| 2004/0032409 A1 | 2/2004 | Girard | |
| 2004/0189670 A1 | 9/2004 | Govindan et al. | |
| 2004/0223003 A1 | 11/2004 | Heirich et al. | |
| 2004/0243940 A1 * | 12/2004 | Lee et al. | 715/744 |
| 2005/0010872 A1 * | 1/2005 | Lee et al. | 715/744 |
| 2005/0081161 A1 * | 4/2005 | MacInnes et al. | 715/765 |
| 2005/0088447 A1 | 4/2005 | Hanggie et al. | |
| 2005/0140694 A1 * | 6/2005 | Subramanian et al. | 345/619 |
| 2005/0168471 A1 | 8/2005 | Paquette | |
| 2005/0219255 A1 | 10/2005 | Lin et al. | |
| 2005/0231512 A1 * | 10/2005 | Niles et al. | 345/473 |
| 2005/0248545 A1 * | 11/2005 | Nishimura et al. | 345/173 |
| 2006/0055700 A1 * | 3/2006 | Niles et al. | 345/473 |

FOREIGN PATENT DOCUMENTS

| | | |
|---|---|---|
| EP | 0694879 | 1/1996 |
| EP | 1383080 | 1/2004 |
| EP | 0972273 | 3/2004 |
| WO | 9845815 | 10/1998 |
| WO | 0209039 | 1/2002 |
| WO | 2004027707 | 4/2004 |

OTHER PUBLICATIONS

"Apple Human Interface Guidelines." Apple Computer Inc. Cupertino, CA Mar. 29, 2004. 317 pages.

Elliott, "Programming Graphics Processors Functionally."

Gelder, et al. "Direct Volume Rendering with Shading via Three Dimensional Textures" Computer Science Department, Univ. of California, Santa Cruz, CA 95064.

Haeberli, P. et al. "The Accumulation Buffer: Hardware Support for High-Quality Rendering" Computer Graphics, New York, NY, vol. 24, No. 4, Aug. 1, 1990, pp. 309-318.

nVIDIA, "Cg—Teaching Cg" Power Point Presentation, Author and date unkown.

Segal et al. "The OpenGL® Graphics System: A Specification (Version 1.5)" Copyright © 1992-2003 Silicon Graphics, Inc., Oct. 30, 2003.

Shantzis, "A Model for Efficient and Flexible Image Computing" Computer Graphics Proceedings, Annual Conference Series, 1994, pp. 147-154.

International Search Report dated Jul. 27, 2005 (PCT/US05/008804; 119-0033WO).

International Search Report dated Aug. 8, 2005 (PCT/US05/008805; 119-0034WO).

Akeley, et al., "Real-Time Graphics Architecture" http://www.graphics.stanford.edu/courses/cs448a-01-fall, The OpenGL® Graphics System—CS448 Lecture 15, Fall 2001, pp. 1-20.

Gelder, et al., "Direct Volume Rendering with Shading via Three Dimensional Textures" Computer Science Dept., Univ. of California, Santa Cruz, CA 95064.

Haeberli, P. et al., "The Accumulation Buffer: Hardware Support for High-Quality Rendering," Computer Graphics, New York, NY, vol. 24, No. 4, Aug. 1, 1990, pp. 309-318.

Segal, et al., "The OpenGL® Graphics System: A Specification (Version 1.5)" Copyright © 1992-2003 Silicon Graphics, Inc., Oct. 30, 2003.

* cited by examiner

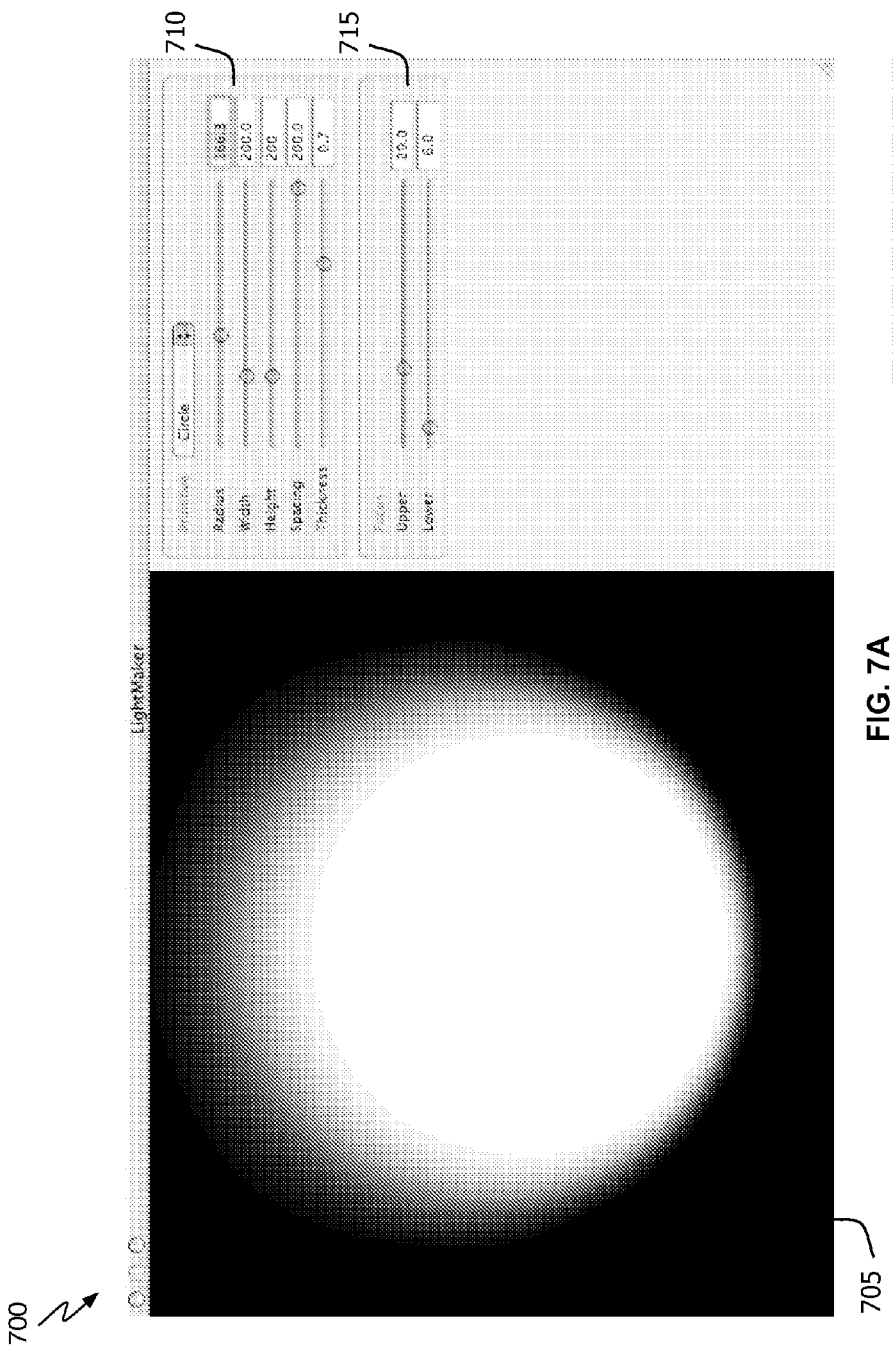
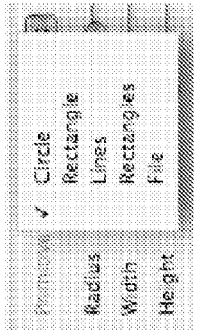
FIG. 7A
FIG. 7B

RESOLUTION INDEPENDENT USER INTERFACE DESIGN

RELATED APPLICATION

This application is a continuation-in-part of, and claims priority to, U.S. patent application Ser. No. 10/876,298, entitled "User-Interface Design," filed 24 Jun. 2004 and which is hereby incorporated by reference.

BACKGROUND

The invention relates generally to graphical user interface design and more particularly to a means for specifying a graphical user interface object in a procedural and largely display resolution independent manner.

Designing an efficient, ergonomic and aesthetically pleasing user interface is an integral stage of most application development projects. The graphical user interface ("GUI") is what the user sees and interacts with. Accordingly, the GUI must present information and choices to a user in a way that is not only pleasing and natural to the eye but conducive to efficient use of the underlying application. One major concern in the development of modern GUIs is the resolution of the various objects that comprise the GUI. Typically, a designer designs a graphical user interface object (e.g., a pushbutton, scrollbar, or slider) for a specified resolution. As the resolution of the user's display changes, however, display of the originally designed object may become distorted. This is particularly a problem when a graphical object is designed at a first resolution (e.g., 75 or 100 pixels per inch) and the user's display is at a second, higher resolution (e.g., 120 or 150 pixels per inch).

In the past, two general techniques have been used to address the problem associated with displaying objects designed for a first resolution but which are displayed at a second resolution. In the first, an original (low resolution) object is up-sampled to generate a larger image (e.g., through linear or bicubic interpolation). This technique results in blurry edges such that the user interface no longer looks crisp. In the second, an original object is designed for display at a high resolution and is then down-sampled to an unknown target resolution. While useful in some circumstances, it is not possible a priori to know what width to give a line (e.g., an object's edge) at the higher resolution such that when down-sampled it remains crisp. This is particularly true when there are multiple target resolutions. Thus, both up-sampling and down-sampling techniques tend to disturb the designer's specified line width. One of ordinary skill in the art will recognize that line width is a critical factor in GUI design as the width of lines define the edge of graphical objects. If edges appear blurry or ill-defined, the entire GUI design may be compromised.

Thus, it would be beneficial to provide a means to specify the design of a graphical user interface object independent of its display resolution. Such a description may advantageously be used by a rendering module to display the designed object at substantially any resolution.

SUMMARY

In one embodiment, the invention provides a method to represent a graphical user interface object's material map in a procedural and, therefore, resolution independent manner. The method includes receiving values for each of a plurality of attributes associated with a material map object, associating a value for each of the plurality of attributes, and storing the plurality of attributes and their associated values in a file. The file may be a "flat" file or a hierarchically-ordered file. The collection of attribute-value pairs comprise a complete description of the graphical user interface object's material map and may be used by a rendering module to create a visual representation of the material map at any number of resolutions. In addition, because material maps in accordance with the invention are represented procedurally, they may be encrypted to prevent unauthorized inspection or use.

Those of ordinary skill in the art will recognize that methods in accordance with the described invention may be embodied in programs, program modules or applications that may be stored in any media that is readable and executable by a computer system.

BRIEF DESCRIPTION OF THE DRAWINGS

FIGS. 7A and 7B show screen images of a light source editor window in accordance with one embodiment of the invention.

DETAILED DESCRIPTION

Figure 1:
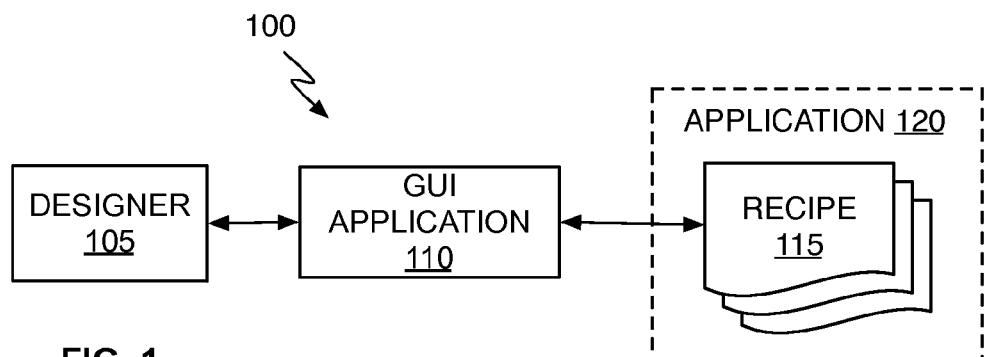
FIG. 1 shows, in block-diagram format, generation of recipe files in accordance with one embodiment of the invention.

Methods, devices and systems to describe or capture the design of graphical user interface objects in a procedural and, largely resolution independent, manner are described. The following embodiments of the invention, described in terms of graphical user interface object design conforming to the Apple Human Interface Guidelines, are illustrative only and are not to be considered limiting in any respect. (The Apple Human Interface Guidelines are available from Apple Computer, Inc. of Cupertino, Calif.)

It has been determined that a graphical user interface object may be completely described by a collection of resolution-independent attributes. The collection of all attributes for a given object type define that type of object (e.g., pushbuttons). While the attributes used to define an object may vary, in whole or in part, from object-type to object-type, one of ordinary skill in the art will recognize those attributes needed to completely specify a given object. For example, while some attributes may be associated with a number of different graphical interface objects (e.g., those associated with an object's location in a display window), many attributes may change from object to object (e.g., buttons have attributes associated with the "button" metaphor while check-boxes and slider tracks have attributes particular to their visual metaphor). Accordingly, the attributes identified herein are illustrative only and should not be used to limit the claimed methods, devices and systems.

Just as a specific collection of attributes define a specific type of graphical interface object (e.g., pushbuttons), the values associated with each of the specific attributes define a particular implementation or embodiment of the object (e.g., a regular size, deactivated pushbutton). In accordance with the invention, some attribute-values are specified independent of the resolution at which the object is to be displayed while other attribute-values are specified for two or more resolutions. In general, those attributes associated with the physical location or geometry of an object may be associated with a plurality of values—one value for each specified resolution. Other attributes are associated with fixed, resolution independent, values (e.g., visual characteristics such as opacity, color and curvature). By way of example, consider a pushbutton object whose radius (attribute "buttonRadius") is specified for each of five predetermined resolutions (e.g., 100, 120, 125, 133.3 and 150 pixels per inch), but whose outline color (attributes "outlineRed", "outlineGreen", and "outlineBlue") and opacity (attribute "buttonOpacity" are fixed and resolution independent.

Thus, in accordance with the invention the collection of all attribute-values for a specified object completely define its visual characteristics and, as such, may be used to drive the graphical generation of the object (for example, by a rendering engine or operating system module responsible for rendering images). One benefit of object definitions in accordance with the invention is that graphical objects are defined in terms of a collection of resolution independent attributes. Another benefit of object definitions in accordance with the invention is that each attribute may be associated with a plurality of values, thereby permitting the designer to optimize the object's design for each of a specified number of resolutions. Still another benefit of object definitions in accordance with the invention is that if the actual displayed resolution of the graphical object is between two of the resolutions specified by the designer, the rendering engine may interpolate between the two values—a technique that generally provides a significantly improved display over prior art up-sampling or down-sampling techniques.

In accordance with the invention, a graphical user interface object's design is specified by a collection of attribute-value pairs that are retained or stored in a file, hereinafter referred to as a "recipe" file. In one embodiment, the recipe file may be a "flat" file consisting of sequential listing of attribute-value pairs. In another embodiment, the recipe file may be a hierarchically ordered file representing an inverted tree, where the root of the tree identifies the type of graphical object (e.g., a pushbutton, a check-box or a slider track) and the first level below the root identifies categories associated with the object (e.g., size, color and state). In one particular embodiment, hierarchically ordered recipe files are stored as extensible Markup Language ("XML") files. Attributes and their values are then associated with each node. In this way, every aspect of a graphical user interface object may be systematically identified and recorded in the recipe file in a manner that is wholly independent from the method used to physically draw (render) the image on a computer display device.

Methods, devices and systems in accordance with the invention may be described in terms of two phases. In a first phase, recipe files are generated. In a second phase the recipe files are used to generate visual representations of the graphical user interface object for one or more applications at substantially any resolution.

Figure 2:
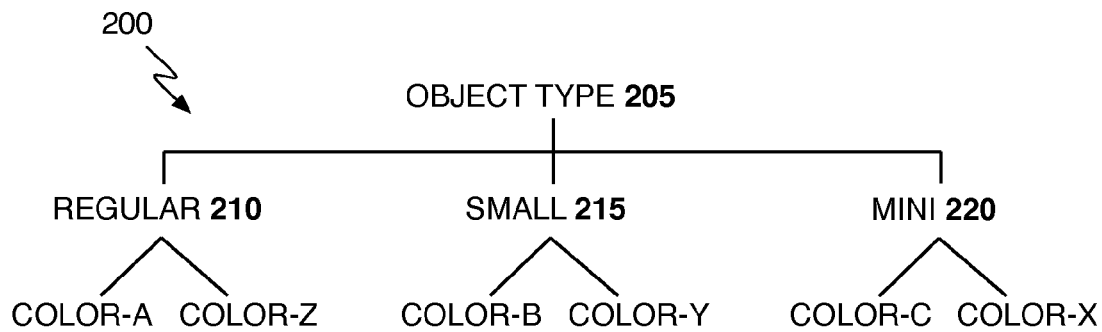
FIG. 2 shows a hierarchical structure for use in a recipe file in accordance with one embodiment of the invention.

Referring to FIG. 1, phase 1 100 is typically performed by designer 105 interacting with GUI design application 110 to generate one or more recipe files 115 for application 120. As noted above, recipe file(s) 115 may be organized in a hierarchical manner. FIG. 2 shows hierarchy 200 that has been found useful in the design of graphical user interface objects in accordance with the invention. As illustrated, root node 205 identifies the object type (e.g., pushbutton). Subordinate to root node 205 are nodes representing the relative size of the displayed object: Regular 210, Small 215 and Mini 220. It will be recognized that the sizes represented by nodes 210, 215 and 220 refer to the relative physical sizes of the displayed object and do not relate to the resolution at which such objects are displayed. Subordinate to the size nodes are "color" nodes, representing the fact that each (sub-) type of object may be associated with similar or separate and distinct color characteristics. Subordinate to the color nodes are states that each version of the object may assume, where a state is defined by the collection of attribute-value pairs associated with that (sub-) type of object. Thus, each node in the tree (root node 205 included) has a set of attribute-value pairs associated with it. In one embodiment, the root is fully populated—it always contains all attribute-value pairs needed to define the object. In this embodiment, each subordinate node only contains attribute-value pairs that serve to override the inherited attribute values of their parent node. For example, "Regular" node 210 may only possess size-based attributes (and their associated values), while Color-A node subordinate to node 210 may only serve to override the object's material map attribute-value (the main color of the object) and also perhaps the outline color attribute values.

Figure 3:
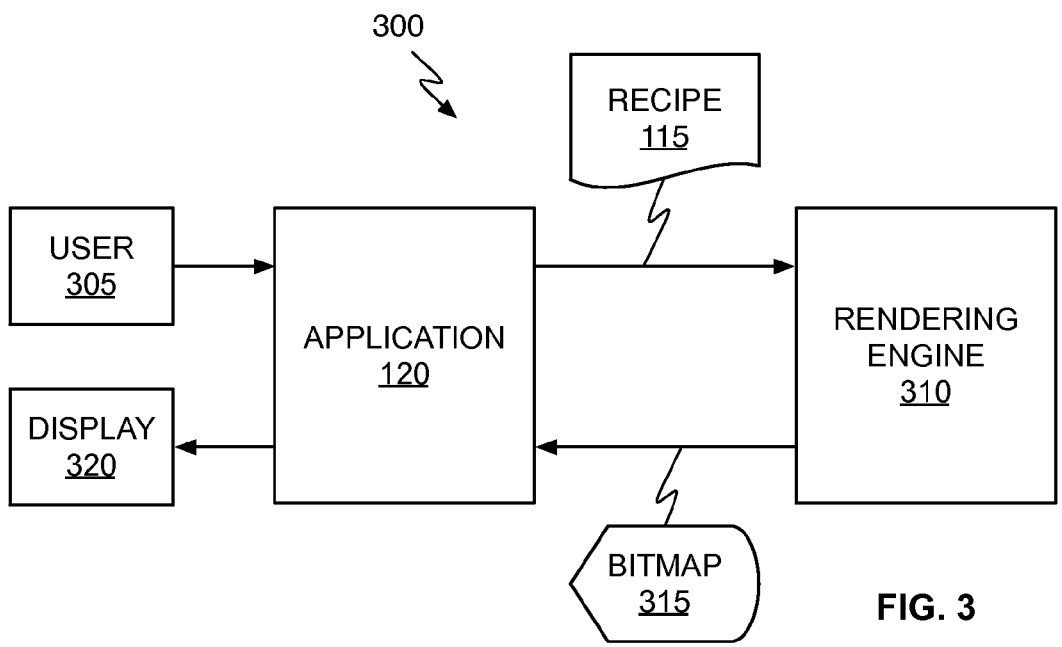
FIG. 3 shows, in block-diagram format, use of recipe files in accordance with one embodiment of the invention.

Referring to FIG. 3, phase 2 300 is typically performed when user 305 interacts with application 120 in such a manner as to require display of the graphical user object designed in accordance with phase 1 100. In one embodiment when this occurs, application 120 transmits recipe file 115 to rendering engine 310 which returns bitmap 315 which, ultimately, is presented to user 305 via display unit 320. In another embodiment, application 120 may extract the necessary information (in the form of attribute-value pairs) form recipe file 115 and transmit those to rendering engine 310. In still another embodiment, application 120 may indicate to rendering engine 310 where the recipe file(s) are located. One of ordinary skill will recognize that rendering engine 310 may be a stand-alone component or module directly accessible by applications or, alternatively, may be but one module of a larger graphical processing framework supported by the underlying operating system. One such modular or "framework" approach is described in the commonly owned and co-pending patent application entitled "System for Optimizing Graphics Operations" by John Harper, Ralph Brunner, Peter Graffagnino, and Mark Zimmer, Ser. No. 10/825,694, incorporated herein by reference in its entirety.

Figure 4:
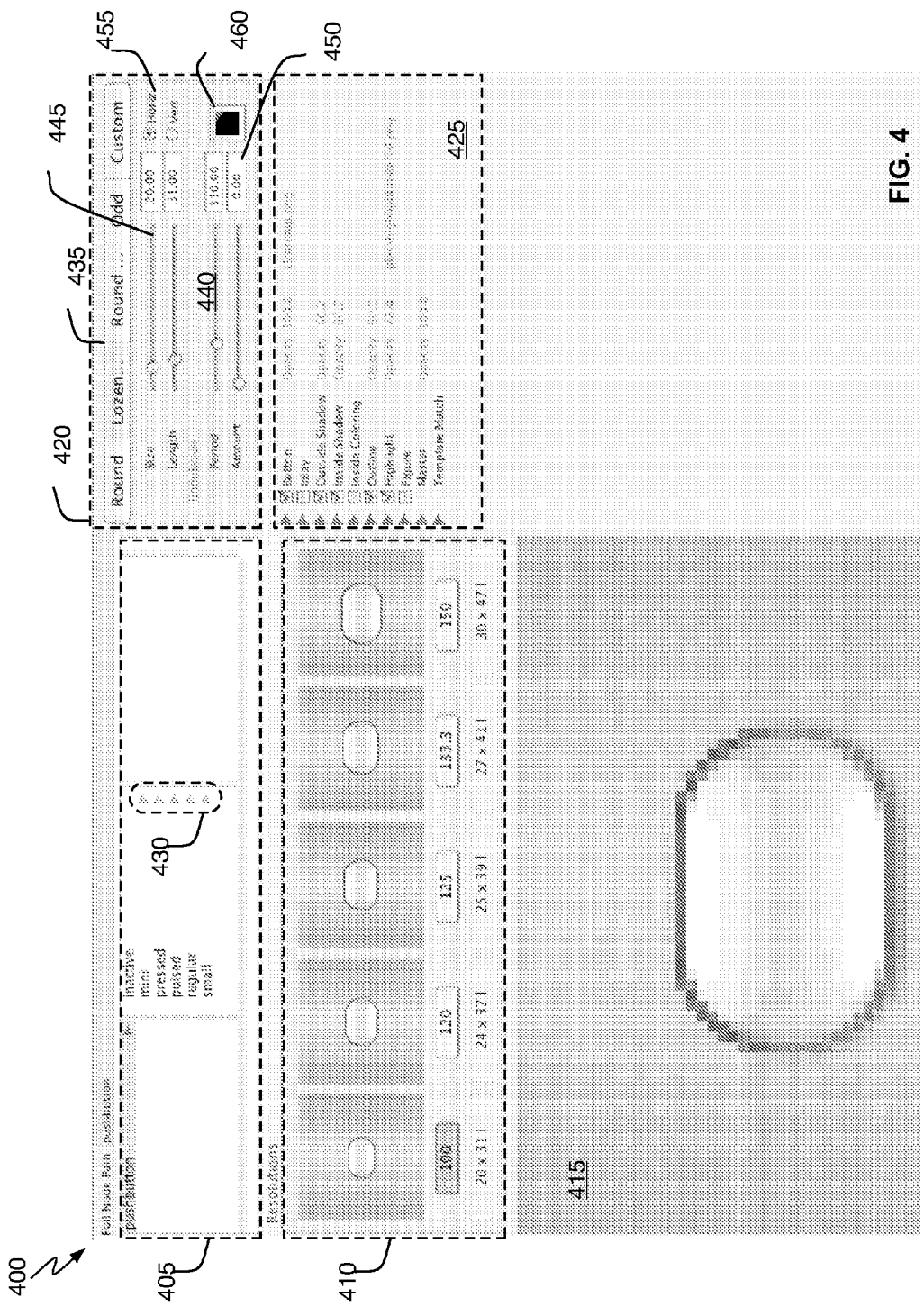
FIG. 4 shows a screen image of a graphical user interface object design application in accordance with one embodiment of the invention.
Figure 5A:
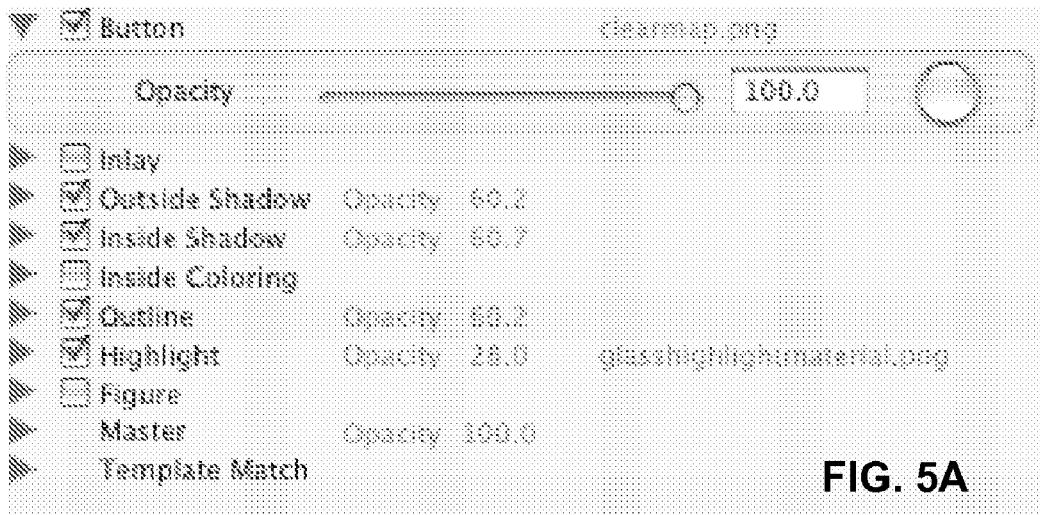
FIGS. 5A through 5J show screen images of various graphical object layer attributes and values in accordance with one embodiment of the invention.
Figure 5B:
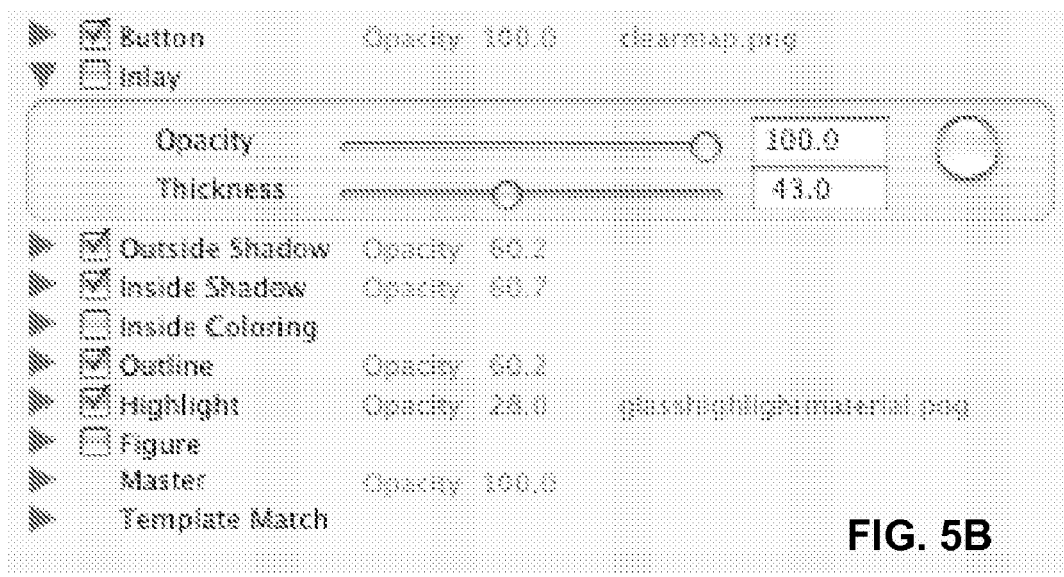
Figure 5C:
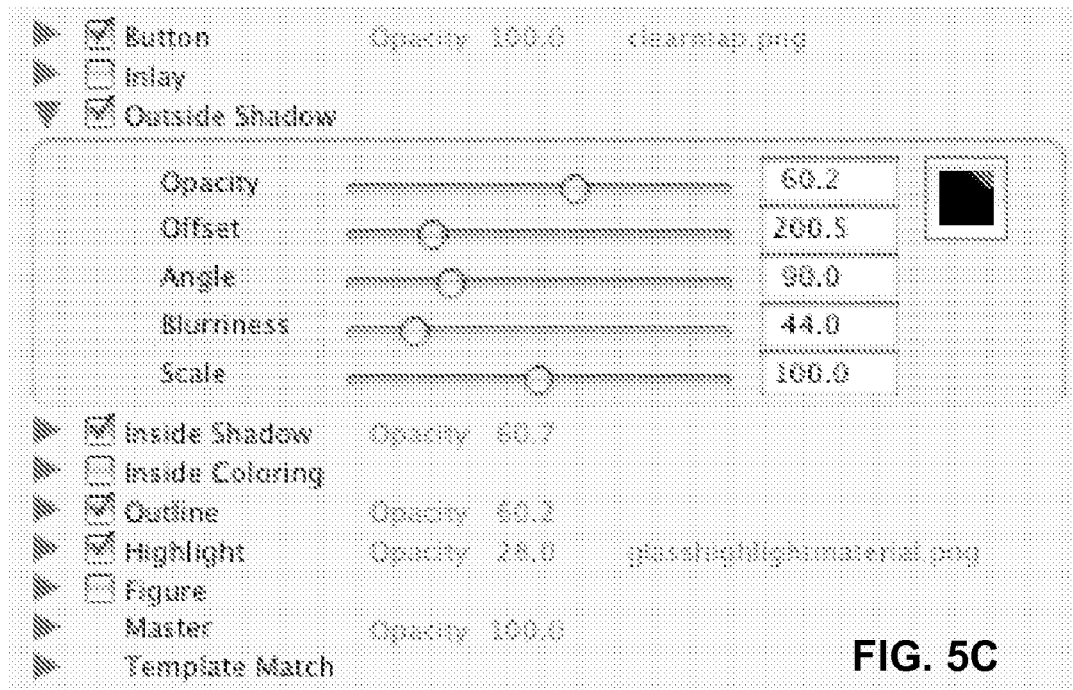
Figure 5D:
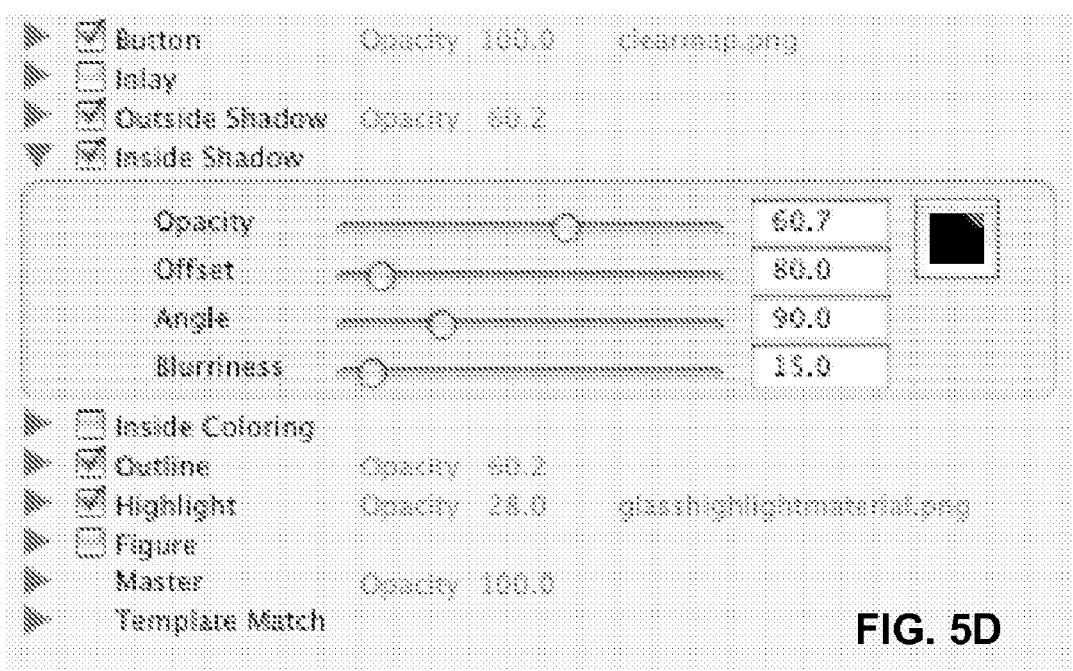
Figure 5E:
Figure 5F:
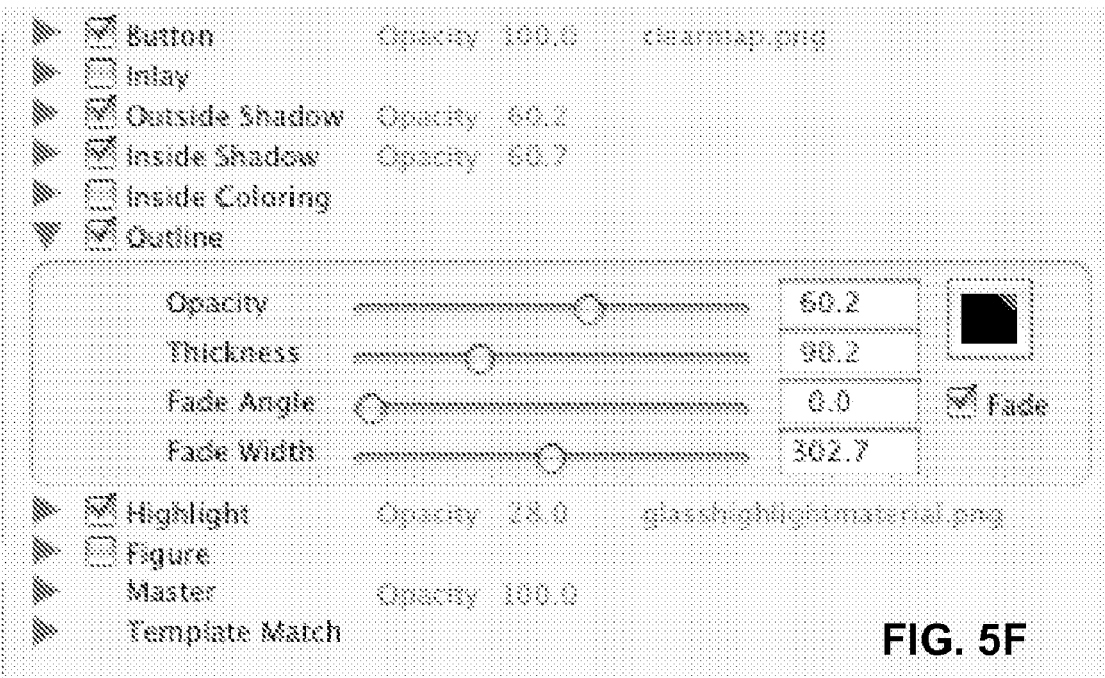
Figure 5G:
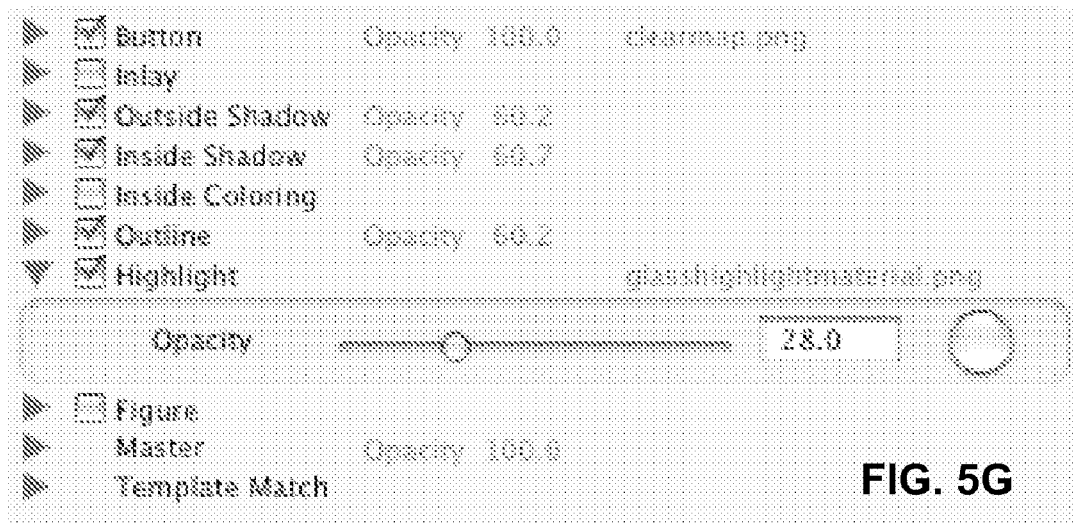
Figure 5H:
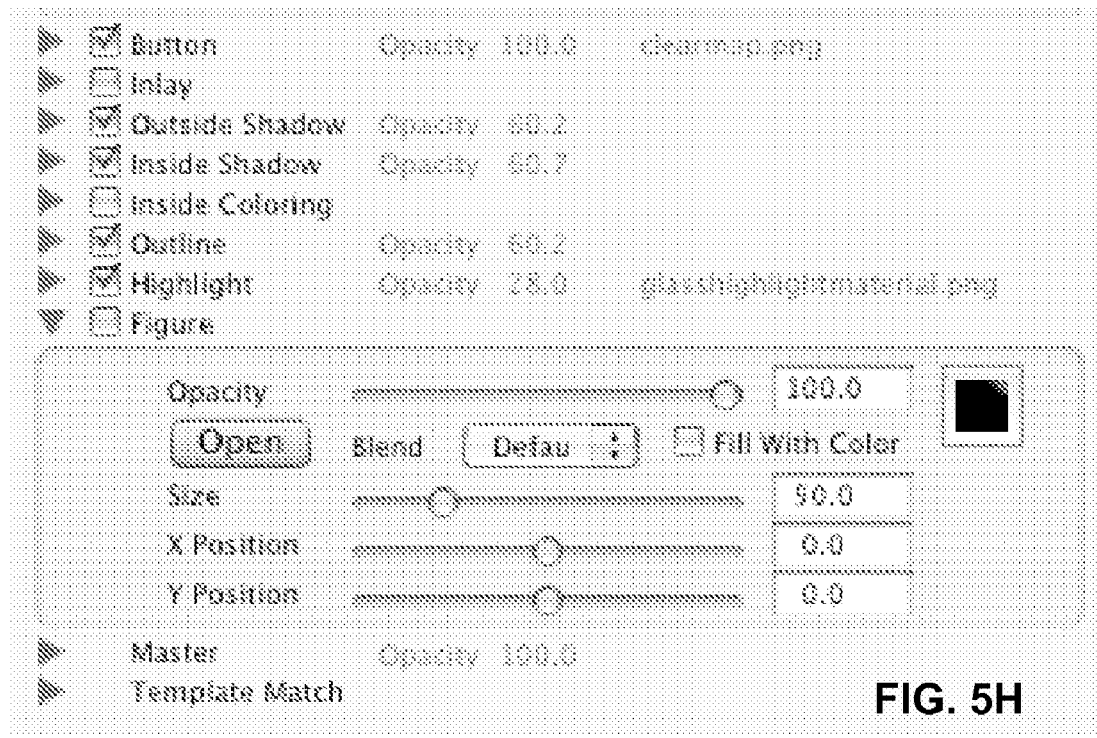
Figure 5I:
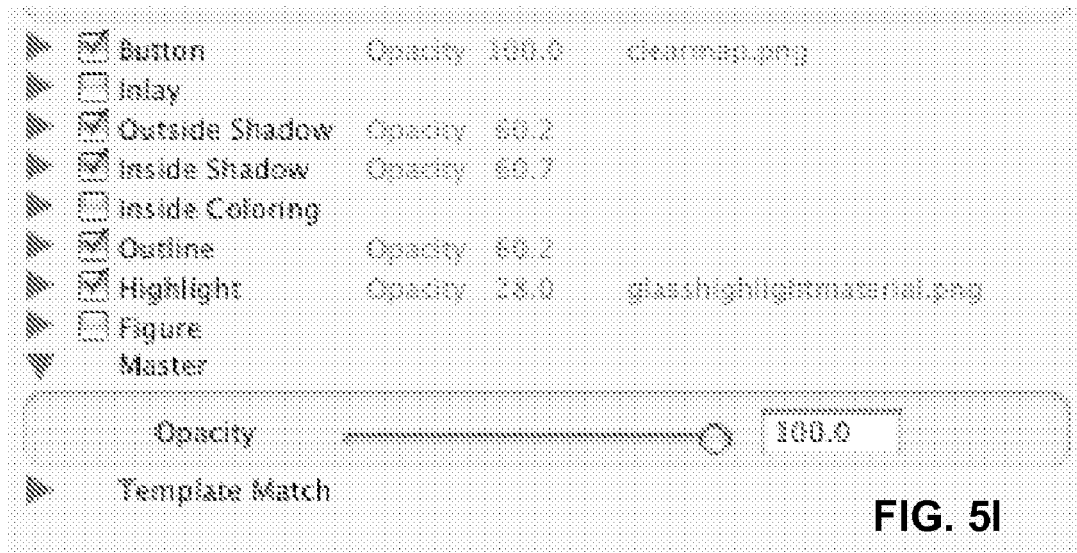
Figure 5J:
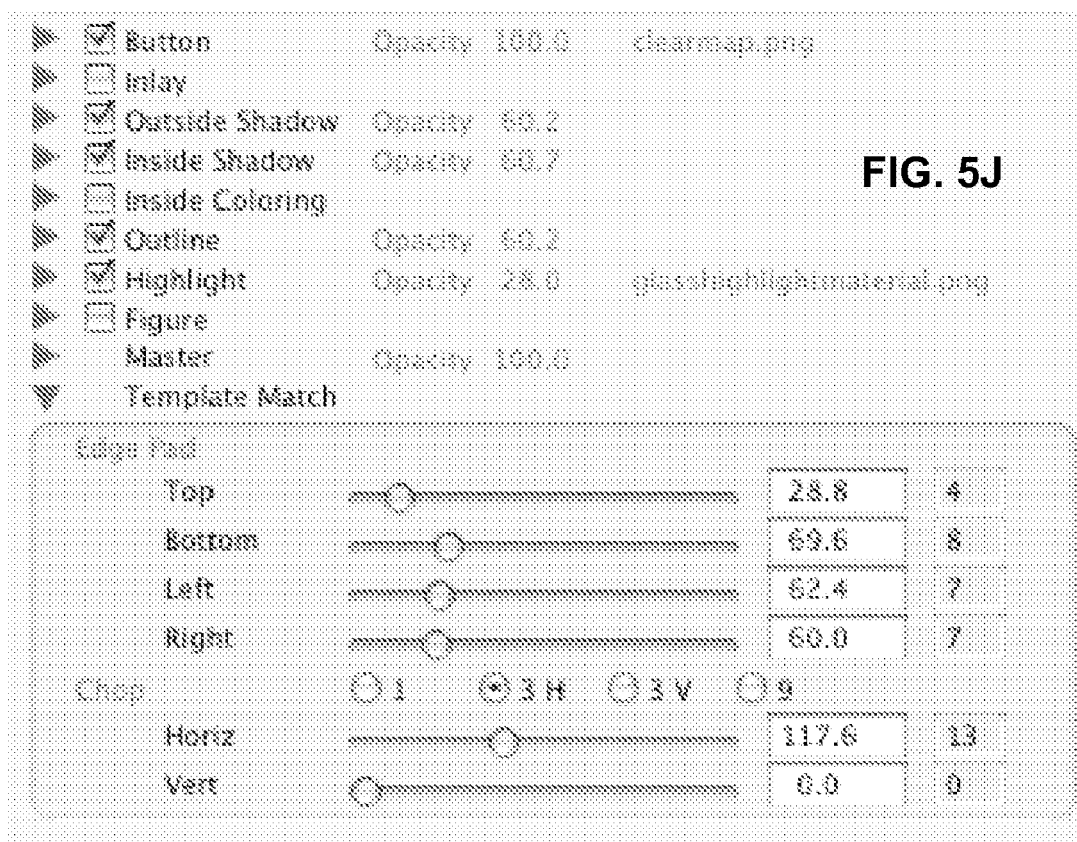

Referring to FIG. 4, in one embodiment a GUI designer may use interface object design application 400 to design, for example, a pushbutton object. Illustrative design application 400 includes browser region 405, resolution display region 410, expanded bit display region 415, object shape region 420 and user interface construction region 425.

Browser region 405 permits the selected display of various aspects of an object's design. In particular, region 405 provides a graphical representation of a recipe file's hierarchical structure in an Apple standard "Finder" format: the left-most pane identifies the recipe file's root (which, in turn, identifies the type of object—a pushbutton); the middle pane identifies categories of pushbuttons (e.g., inactive, mini, pressed, pulsed, regular and small). Subsequent panes display subcategories associated with a selected category. For example, disclosure triangles 430 indicate that pushbutton categories mini, pressed, pulsed, regular and small have additional aspects—the details of which are displayed in the right-most (and possibly subsequent) panes when one of these categories is selected.

Resolution display region 410 identifies one or more resolutions for which the object is being designed. As shown, the designer has specified that at least some attribute values for a pushbutton are specified for resolutions of 100, 120, 125, 133.3 and 150 pixels per inch. As noted above, not all attribute values are specified for each of these resolutions, only those that the designer determines are significant to the object's display. Illustrative attribute-value pairs for a pushbutton object and a scrollbar object, including those attributes having multiple values, are shown in Table 1 below. (It will be recognized that the objects shown in region 410 are not actually displayed at the indicated resolution, but are instead "simulations" of how the object would appear at those resolutions.)

Expanded bit display region 415 shows an expanded representation of the selected resolution image. In the illustrated example of FIG. 4, region 415 shows the 8× pixel-zoomed representation of the 100 pixel per inch pushbutton. Region 415 may be used, for example, to visually inspect the quality of the user interface object rendering or to compare the user interface object rendering with another pixel-zoomed rendering displayed in an image-editing application.

Object shape region 420 permits the designer to select, view and specify attribute values associated with a particular shape of the object being designed. For example, in the illustrated embodiment a pushbutton's shape may be any one of the shapes identified by shape buttons 435: Round, Lozenge ("Lozen..."), Round Rectangle ("Round..."), odd ("Scroll bar cap odd end") or custom. Immediately beneath shape buttons 435, area 440 shows specific attributes associated with the selected shape and, through controls such as slider 445, text box 450, radio button 455 or color well 460 permits the designer to change the value associated with those attributes.

User interface construction region 425 serves as the primary interface for viewing and specifying attribute values associated with an object's various visual characteristics or layers. In the embodiment of FIG. 4, for example, a pushbutton may be comprised of Button, Inlay, Outside Shadow, Inside Shadow, Inside Coloring, Outline, Highlight, Figure, Master and Template Match layers. Each layer may be individually selected (noted by a check box alongside the layer's title) and each layer's respective attributes (and means for setting their value) may be individually disclosed through activation of their disclosure triangles (the dark triangle to the immediate left of each layer title's check box), see FIGS. 5A through 5J.

Thus, in accordance with the invention a graphical user interface object may be completely defined by a collection of attribute-value pairs that may be used by a rendering engine (or similar module) to display the object. Further, one or more attributes may have two or more values, wherein each value is associated with a specific display resolution. This latter feature permits a designer to uniquely and specifically optimize a single design for multiple resolutions with the added benefit of providing sufficient information for interpolation (generally performed by the rendering engine) should the actual resolution be different from any of the specified resolutions. By way of example only, Table 1 comprises a listing of attributes and their associated values for a pushbutton object and a scrollbar object.

TABLE 1

Illustrative Attribute-Value Pairs

| Attribute | Pushbutton Value | Scrollbar Value |
|---|---|---|
| buttonCenterX [1] | 48/100, 48/133.333, 47.5/150 | 48/100, 48.5/120, 48/125, 48.5/133.333, 48.5/150 |
| buttonCenterY [1] | 48/100, 48/120, 48.5/125, 48.5/133.333, 48/150 | 48/100, 48.5/120, 48/125, 48.5/133.333, 48.5/150 |
| buttonCurvature | 0.7071 | 0.7071 |
| buttonMaterialAngle [2] | 0 | 0 |
| buttonMaterialBlur [2] | 0 | 0 |
| buttonMaterialBright [2] | 0 | 0 |
| buttonMaterialChoke [2] | 1 | 1 |
| buttonMaterialContr [2] | 0 | 0 |
| buttonMaterialEdge [2] | 0 | 0 |
| buttonMaterialFlat [2] | 0 | 0 |
| buttonMaterialName [2], [3] | clearmap | aquamaterial |
| buttonMaterialPull [2] | 0 | 0 |
| buttonMaxX | 55 | 217 |
| buttonMaxY | 60 | 213 |
| buttonMinX | 23 | 185 |
| buttonMinY | 36 | 189 |
| buttonOffsetX | 0 | 0 |
| buttonOffsetY | 0 | 0 |
| buttonOpacity | 0.868217 | 1 |
| buttonPoint1X [1] | 43/100, 42/120, 41.5/125, 41.5/133.333, 40/150 | 189 |
| buttonPoint1Y [1] | 48/100, 48/120, 48.5/125, 48.5/133.333, 48/150 | 201 |
| buttonPoint2X [1] | 53/100, 54/120, 54.5/125, 54.5/133.333, 55/150 | 213 |
| buttonPoint2Y [1] | 48/100, 48/120, 48.5/125, 48.5/133.333, 48/150 | 201 |
| buttonRadius [1] | 10.5/100, 13/125, 14/133.333, 15.5/150 | 7.5/100, 9/120, 9.5/125, 11/150 |
| buttonRoundness | 0.5 | 0.5 |
| buttonType | 1 | 0 |
| figureBlendMode | 0 | 0 |
| figureBlue | 0 | 0 |
| figureFillWithColor | 0 | 0 |
| figureGreen | 0 | 0 |

TABLE 1-continued

Illustrative Attribute-Value Pairs

| Attribute | Pushbutton Value | Scrollbar Value |
| --- | --- | --- |
| figureName [3] | mixed | figure |
| figureOpacity | 1 | 1 |
| figureRed | 0 | 0 |
| figureSize | 0.5 | 0.5 |
| figureXPosition | 0 | 0 |
| figureYPosition | 0 | 0 |
| highlightMaterialAngle [2] | 0 | 0 |
| highlightMaterialBlur [2] | 41.509434 | 0 |
| highlightMaterialBright [2] | −0.245283 | 0 |
| highlightMaterialChoke [2] | 0.532075 | 1 |
| highlightMaterialContr [2] | 0.433962 | 0 |
| highlightMaterialEdge [2] | 0.481132 | 0 |
| highlightMaterialFlat [2] | −0.226415 | 0 |
| highlightMaterialName [2] | glasshighlightmaterial | highlightmaterial |
| highlightMaterialPull [2] | −0.057/100, −0.038/120, −0.075/125, −0.075/150 | 0 |
| highlightOpacity | 0.279683 | 1 |
| inlayMaterialAngle [2] | 0 | 0 |
| inlayMaterialBlur [2] | 0 | 0 |
| inlayMaterialBright [2] | 0 | 0 |
| inlayMaterialChoke [2] | 1 | 1 |
| inlayMaterialContr [2] | 0 | 0 |
| inlayMaterialEdge [2] | 0 | 0 |
| inlayMaterialFlat [2] | 0 | 0 |
| inlayMaterialName [2], [3] | inlaymaterial | inlaymaterial |
| inlayMaterialPull [2] | 0 | 0 |
| inlayMaxRadius [1] | 12.757/100, 15.795/125, 17.01/133.333, 18.833/150 | 9.133/100, 10.935/120, 11.543/125, 13.365/150 |
| inlayOpacity | 1 | 1 |
| inlayThickness | 0.43 | 0.43 |
| insideColoringBlue | 0.386252 | 0 |
| insideColoringGreen | 0.336153 | 0 |
| insideColoringOpacity | 0.1 | 0.1 |
| insideColoringRed | 0.705882 | 0 |
| insideShadowBlue | 0 | 0 |
| insideShadowBlurRadius [1] | 1.5/100, 1.857/125, 2/133.333, 2.214/150 | 1.072/100, 1.286/120, 1.358/125, 1.572/150 |
| insideShadowGreen | 0 | 0 |
| insideShadowOffsetX | −0 | 0 |
| insideShadowOffsetY [1] | 0.75/100, 0.929/125, 1/133.333, 1.107/150 | 0.536/100, 0.643/120, 0.679/125, 0.786/150 |
| insideShadowOpacity | 0.60686 | 1 |
| insideShadowRed | 0 | 0 |
| masterOpacity | 0.744186 | 1 |
| oddDirection | 0 | 0 |
| outlineBlue | 0.968326 | 0 |
| outlineFade | 1 | 0 |
| outlineFadeAngle | 0 | 0 |
| outlineFadeWidth [1] | 31.78/100, 39.346/125, 42.373/133.333, 46.913/150 | 1/100, 1.2/120, 1.267/125, 1.467/150 |
| outlineGreen | 0.176788 | 0 |
| outlineMaxRadius [1] | 10.5/100, 13/125, 14/133.333, 15.5/150 | 7.5/100, 9/120, 9.5/125, 11/150 |
| outlineOpacity | 0.601583 | 0.4 |
| outlineRed | 0.242527 | 0 |
| outlineThickness [1] | 0.175/100, 0.144/120, 0.139/125, 0.129/133.333, 0.116/150 | 0.267/100, 0.222/120, 0.211/125, 0.2/133.333, 0.182/150 |
| outsideShadowBlue | 0 | 0 |
| outsideShadowBlurRadius | 0.66 | 1.07175 |
| outsideShadowGreen | 0 | 0 |
| outsideShadowOffsetX | −0 | 0 |
| outsideShadowOffsetY | 1.503958 | 0 |
| outsideShadowOpacity | 0.601583 | 1 |
| outsideShadowRed | 0 | 0 |
| outsideShadowScale | 1 | 1 |
| roundRectHorizontal | 1 | 1 |
| roundRectPointerDirection | 0 | 0 |
| roundRectPointerShape | 0 | 0 |
| roundRectPointiness | 1.570796 | 1.570796 |
| showButton | 1 | 1 |
| showFigure | 1 | 0 |
| showHighlight | 1 | 1 |
| showInlay | 0 | 0 |
| showInsideColoring | 0 | 0 |
| showInsideShadow | 0 | 0 |

TABLE 1-continued

Illustrative Attribute-Value Pairs

| Attribute | Pushbutton Value | Scrollbar Value |
| --- | --- | --- |
| showOutline | 0 | 0 |
| showOutlineShadow | 0 | 0 |
| templateMatchBottom [1] | 7.308/100, 9.048/125, 9.744/133.333, 10.788/150 | 7.5/100, 9/120, 9.5/125, 11/150 |
| templateMatchChop [1] | 1 | 0 |
| templateMatchHoriz [1] | 12.348/100, 15.288/125, 16.464/133.333, 18.228/150 | 7.5/100, 9/120, 9.5/125, 11/150 |
| templateMatchLeft [1] | 6.552/100, 8.112/125, 8.736/133.333, 9.672/150 | 7.5/100, 9/120, 9.5/125, 11/150 |
| templateMatchRight [1] | 6.3/100, 7.8/125, 8.4/133.333, 9.3/150 | 7.5/100, 9/120, 9.5/125, 11/150 |
| templateMatchTop [1] | 3.024/100, 3.744/125, 4.032/133.333, 4.464/150 | 7.5/100, 9/120, 9.5/125, 11/150 |
| templateMatchVert | 0 | 7.5/100, 9/120, 9.5/125, 11/150 |
| undulationAmount | 0 | 0 |
| undulationBlue | 0 | 0 |
| undulationGreen | 0 | 0 |
| undulationPeriod [1] | 22/100, 27/125, 28/133.333, 33/150 | 16 |
| undulationRed | 0 | 0 |

[1] The notation W/100, X/125, Y/133.333 and Z/150 indicates a value W should be used for a resolution of 100 pixels per inch, and so forth.
[2] Attributes whose values are set through material maps (i.e., button material map, highlight material map and inlay material map).
[3] Represents a file name. For example, an extension is added (e.g., ".png" for image files or ".pdf" for vector line art files).

In a current embodiment, graphical user interface objects identified in Table 2 may be defined/specified using the attributes (left-hand column) identified in Table 1. It will also be recognized that while many of the attributes above are specified by values in units of pixels, in other embodiments attribute values may be expressed in terms of a relative factor to a predetermined size factor.

TABLE 2

Illustrative Graphical Interface Objects

| | |
| --- | --- |
| Help Button (regular, small, mini) | Back Button (regular, small) |
| Round Button (regular, small) | Push Button (regular, small, mini) |
| Square Bevel Button (regular, small, mini) | Rounded Bevel Button (regular, small, mini) |
| Metal Button (regular, small, mini) | Segment Control (regular, small, mini) |
| Window Title Bar Controls (regular, small, mini) | Disclosure Button (regular, small, mini) |
| Arrow Pop-Up Button (regular, small, mini) | Pop-Up Button (regular, small, mini) |
| Combo Button (regular, small, mini) | Pulldown Button (regular, small, mini) |
| Check Box (regular, small, mini) | Radio Button (regular, small, mini) |
| Scroll Bar Track (regular, small) | Scroll Bar Thumb (regular, small) |
| Scroll Bar Caps (regular, small) | Slider Track (regular, small, mini) |
| Circular Slider Thumb (regular, small, mini) | Pointed Slider Thumb (north, east, south, west orientations) (regular, small, mini) |
| Rectangular Text Field (regular, small, mini) | Round Text Field (regular, small, mini) |
| Tabs (north, east, south, west orientations) | Determinate Progress Bar (regular, small) |
| Asynchronous Progress Indicator | iDisk Synch Progress Indicator |
| Pane Splitter | Drawer |
| List Box | Metal Window Shaping |

To create a graphical user interface object, the body color of the object (for each point on the object) and the anti-aliased visibility mask of the object are needed. The body color of an object may be obtained by using a three-dimensional representation of the object, or by creating a virtual representation of the object that defines the surface normal for each pixel on the object. Once a unit-length surface normal vector is computed at a point p, the x and y coordinate values of this vector may be used to compute the apparent color of the object at point p by looking up a color from the object's relevant material map. (One of ordinary skill in the art will recognize that the term "material map" is also referred to as "environmental map," "reflection map" and "sphere map.") If the map is n pixels high and n pixels wide (this is done because a shaded sphere is inscribed in the map), one can address the material map at the two-dimensional location given by:

$$\left(\frac{(x+1)n}{2}, \frac{(y+1)n}{2}\right) \quad \text{EQ. 1}$$

The color of the material map at this location may be used as the color for the object at point p. To get an accurate result, it is typical for a material map to be much larger (for example, 256×256 pixels or larger) than the graphical user interface object being rendered.

This same technique may be used in conjunction with a material map that possesses alpha (transparency) information. Once a color (with alpha) is looked up from a transparency material map, a highlight may be overlaid onto the object by using the alpha as a coverage fraction for the color from the map. Standard compositing methods may be used to accomplish this overlay operation.

An object's anti-aliased visibility mask may be obtained by computing a field that provides distance from the edge of the object. This field can be evaluated using a procedural description of the object. For example, a lozenge may be defined as the set of points at distance r or less from a finite non-zero-length line segment from point (p1x, p1y) to point (p2x, p2y). The distance d from the aforementioned line segment may be calculated at point (px, py) by a function such as that provided in Table 3 below.

TABLE 3

Illustrative Field (Distance) Calculation for a Lozenge Object

| | |
|---|---|
| Let vx, vy, length, wx, wy, and d be floating point values, then | $d = |(wx \times vy) - (wy \times vx)|$ determine distance from line if $((vx \times wx) + (vy \times wy)) > 0$ that is, if past point p1 |
| $vx = p1x - p2x$ $vy = p1y - p2y$ | |
| $length = \sqrt{(vx)^2 + (vy)^2}$ | $d = \sqrt{(wx)^2 + (wy)^2}$ use distance from p1 |
| $vx = \dfrac{vx}{length}$ | $wx = px - p2x$ $wy = py - p2y$ |
| $vy = \dfrac{vy}{length}$ | if $((vx \times wy) - (vy \times wy)) < 0$ |
| $wx = px - p1x$ | that is, if past point p2 |
| $wy = py - p1y$ | $d = \sqrt{(wx)^2 + (wy)^2}$ |
| Continued in next column (→) | use distance from p2 |

Given the distance function d defined above (see Table 1), an anti-aliased transparency value (mask) for the graphical user interface object may be computed as shown in Table 4. The same distance field may be used to construct the outline of the user interface object.

TABLE 4

Illustrative Transparency Value (Mask) Calculation $$mask = r-d$$
$$\text{if } (mask > 1.0) \, mask = 1.0$$
$$\text{if } (mask < 0.0)$$
$$mask = 0.0$$

In another embodiment, material maps may be represented in procedural fashion. In this embodiment the interface object design application 400 (see FIG. 4) may be enhanced to provide an interface through which material maps may be defined and, subsequently, represented in a procedural fashion. In contrast, prior art material maps for use in user interface elements used images as described above.

Figure 6A:
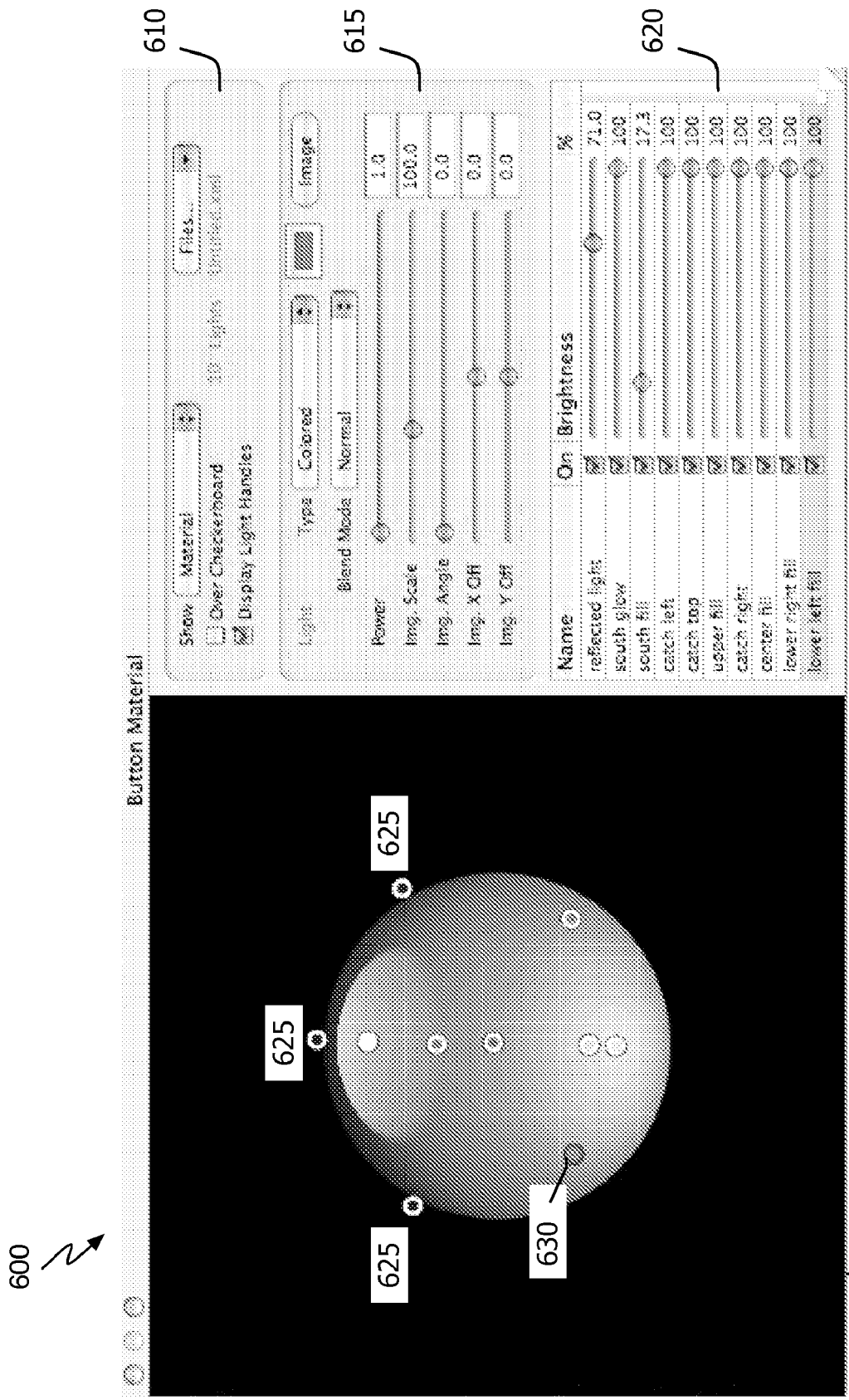
FIGS. 6A through 6E show screen images of various features of a material map editor window in accordance with one embodiment of the invention.

Referring to FIG. 6A, interface object design application 400 may be enhanced to provide material map editor window 600 that includes material map display region 605, material map control region 610, light property region 615 and light list region 620.

Material map display region 605 graphically displays the currently selected material map and may also display individual light sources associated with the displayed material map. In the embodiment of FIG. 6A, light sources may be created by "clicking" on the material map's graphical display where a light handle does not already exist (in FIG. 6A, light handles are represented by circles in display region 605). In one embodiment, when a new light source is created in this way, a duplicate of the currently selected light source is created and placed at the location which was clicked. In similar fashion, a light source may be moved by selecting (e.g., "clicking") and dragging the light handles to the desired position. Further, a user may place a light source "behind" the material map by placing the light source off the material map's surfaces such as shown with light handles 625 in FIG. 6A. Similarly, a light source may be selected by "clicking" on it (see discussion below).

Figure 6B:
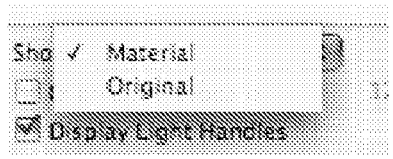
Figure 6C:
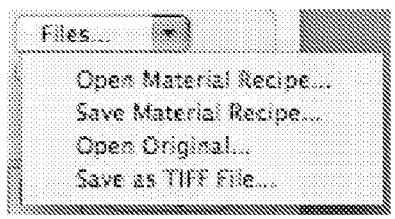

Material map control region 610 permits the user to control the overall presentation of a material map and, in addition, selection and storage of the material map. For example, the material map may be displayed having a checkerboard background by selecting the "Over Checkerboard" check-box and light handles may be displayed by selecting the "Display Light Handles" check-box. Referring to FIG. 6B, the "Show" drop-down menu allows a user to show the material map to be built (by selecting the "Material" item) or a flat material map that is an image in accordance with prior art material maps (by selecting the "Original" item). Referring to FIG. 6C, the "Files" drop-down menu permits the user to open a previously stored procedural representation of a material map (i.e., a Material Recipe file), save the displayed material map as a material recipe file, open an original graphical material map (i.e., an image) or save the displayed material map as an image (i.e., to generate a graphical material map).

Light property list region 615 permits the user to set various properties of a selected light source. For example, if light source 630 is selected (see FIG. 6A), its properties would appear in region 615. Through slider controls of the type generally known in the art properties of the selected light source may be adjusted. For example, the power slider may be used to set whether the light source is diffuse (a lower value) or specular (a higher value). For image and image masked light sources (see discussion below): the image scale slider may be used to set the size of the image that is reflected off the material map's surface; the image angle slider may be used to control the rotation of the reflected image about the point of contact between the image and the material map's surface; and the image X and Y offset sliders may be used to control the point at which the reflected image contacts the material map's surface.

Figure 6D:
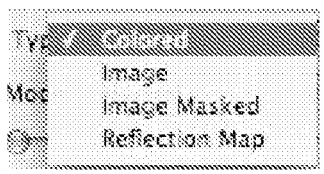
Figure 6E:

In addition, drop-down menus may be used to set the "Type" and "Blend Mode" for the selected light source. Referring to FIG. 6D, in the illustrative embodiment a light source's "type" may be selected as colored, image, image masked or reflection map. A "colored" light source is a colored light with a circular distribution (when viewed straight-on) and is defined such that it can describe a diffuse (e.g., a power value of 0) or specular (e.g., a power value of 64) light source. An "image" light source describes an image, potentially masked by using an alpha transparency mask, that is placed tangent to the material map's surface at the location of its associated light handle. An "image masked" light source is like an "image" light source but is additionally masked by the same distribution as defined by a colored light source. A "reflection map" light source is a whole light ball image that is placed on top of the material map's surface and which may be rotated by "image angle" sliders. It is noted that for a reflection map type of light source, of all the image-applicable sliders, only the image angle slider is applicable. In a similar fashion, the "Blend Mode" of the selected light source may be set through the "Blend Mode" drop-down menu as shown in FIG. 6E. Since each of the blend modes identified in FIG. 6E are generally known in the art, they will not be described further.

Light list region 620 lists all light sources associated with the displayed material map. In addition, region 620 permits the user to activate each light source (e.g., through "On" check-boxes) and to set the "Brightness" of each light source (e.g., through slider-type controls) individually. In the illustrated embodiment, individual entries in the list of light sources may be selected (e.g., by "clicking" on its "Name" and dragged up or down in the list to adjust its display priority. In one embodiment, the first light source in the list has the front-most in priority while the last light source in the list has the back-most priority. In this way, light sources may be treated like "layers" that are composited on top of each other using blend modes. This manner of layering objects is well-known in the art.

Referring to FIG. 7A, in one embodiment, image, image masked or reflection map lights may be procedurally defined through light maker window 700. As shown, light maker window 700 includes light image display region 705, light image primitive region 710, and light image focus region 715. As in prior editing windows, light image display region 705 shows a graphical representation of a light source that is defined in accordance with the attribute or characteristic values set (and shown) in regions 710 and 715. For illustrative purposes, a circular type light image is shown in FIG. 7A. Referring to FIG. 7B and light image primitive region 710, other types of light sources that may be defined procedurally in accordance with the invention include rectangle shapes ("Rectangle"), horizontal lines ("Lines") and rectangles (i.e., a pane split horizontally or vertically, or both). In addition, an existing image file image may be imported by selecting the "File" item in FIG. 7B.

Referring again to FIG. 7A, light image primitive region 710 includes five (5) slider controls that may be used to adjust or set the value corresponding to the light source's radius, width, height, spacing and thickness characteristics or attributes. In the illustrative embodiment, the Radius slider applies to the Circle image type, and controls its size. The Width and Height sliders apply to the Rectangle, Lines, and Rectangles image types and control their size (bounds). The Spacing slider applies to the Lines and Rectangles image types, and control the distance in between lines or between sub-panes. The Thickness slider applies to the Lines and Rectangles image type, and controls the amount of coverage for the lines or sub-panes. For example, a value of 50% would make the lines the same thickness as the distance between them. Similarly, slider controls may be used in light image focus region 715 to set the amount of blur applied to the image. The Upper and Lower sliders control the amount of blur, in pixels, applied to the top and bottom of the image primitive. In the example illustrated in FIG. 7A, it applies to the top of the circle and the bottom of the circle, respectively.

Once a material map has been defined in material map editor window 600, the user may save the map in a procedural file by selecting the "Save Material Recipe" item from the "Files" drop-down menu (see FIG. 6C). In one embodiment, each property identified through light property region 615 and light list region 620 is used as an attribute tag and the properties associated value (e.g., Power value 1.0 and 1 mg. Scale value of 100 as shown in FIG. 6A) as a value for that property. This is in keeping with the attribute-value description illustrated in Table 1 above. As previously noted, attribute value pairs may be stored in a flat file or a hierarchically-ordered file such as an XML file.

Referring again to FIG. 6A, when a new material map is to be generated (such as when a material map editor window 600 is initially opened), default values may be assigned to one or more of the material map's properties. For instance, a single light source may be instantiated with a specified collection of default property values. By way of example only, a default light source may be "Colored" (see FIG. 6D), have a "Normal" blend mode (see FIG. 6E), a "Power" value of 1, be "on" and have a brightness of 50%.

It will be recognized by those of ordinary skill in the art that the information (i.e., attribute or properties and their associated values) retained in a material map's recipe file may be used to generate a graphical representation of the material map. Unlike prior art user interface material maps, recipe files in accordance with the invention may be used to dynamically generate the images which can reduce the amount of memory needed to store a user interface and substantially reduce the time required to create a specific user interface element. In addition, because material maps in accordance with the invention are represented in a procedural manner they are resolution independent. This is in sharp contrast with prior art material maps that rely on an image having a set or fixed resolution. Thus, a single (procedurally defined) material map may be used for all resolutions rather than having to have multiple material maps—each at a display resolution. Further, because material maps in accordance with the invention are procedural in nature, they may be encrypted to protect their content. (That is, the text recipe file is encrypted.)

Various changes or modifications in the foregoing description may be made without departing from the concept of the invention. For example, attributes other than, or in addition to, those identified in Table 1 and in FIG. 6 may be used to specify an object. In addition, hierarchical storage means other than an XML file may be used to store an object's procedural specification.

It will be recognized that methods to represent and render a graphical user interface object in accordance with this description may be performed by a programmable control device executing instructions organized into one or more program modules. A programmable control device may be a single computer processor, a special purpose processor (e.g., a digital signal processor, a graphics processing unit or a programmable graphics processing unit), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Accordingly, the preceding descriptions were presented to enable any person skilled in the art to make and use the invention as claimed and were provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

The invention claimed is:

1. A method to represent a material map for a graphical user interface element for presentation by a programmable control device, the method comprising:
   receiving, by a programmable control device, information to define a plurality of attribute-value pairs for a material map, each attribute-value pair comprising a display attribute and one or more data items, the material map for use with presenting a graphical user interface element on a display device;
   associating each received data item with a corresponding display attribute,
   wherein at least one data item comprises two or more display time values for the associated display attribute, the two or more display time values corresponding to two or more run-time resolution settings of the display device, wherein the plurality of attribute-value pairs are sufficiently complete to permit the material map to be rendered on the display device using display time values corresponding to an operational resolution setting of the display device; and storing the plurality of attribute-value pairs of display attributes and their associated data items in a file accessible by the programmable control device.

2. The method of claim 1, wherein the act of associating comprises assigning a default display time value to a data item of one or more of the display attributes.

3. The method of claim 1, further comprising providing the file to a rendering means for generating a visual representation of the graphical user interface object's material map.

4. The method of claim 1, wherein a display time value for a data item associated with at least one display attribute of the graphical user interface object's material map is independent of a display device operational resolution setting.

5. The method of claim 1, wherein the act of associating comprises a user explicitly associating a display time value with a data item of one or more of the display attributes.

6. The method of claim 1, wherein the act of storing comprises storing display attributes and their associated data items in a flat file.

7. The method of claim 1, wherein the act of storing comprises storing display attributes and their associated data items in a hierarchically-ordered file.

8. The method of claim 1, wherein the act of storing comprises storing display attributes and their associated data items in an eXtensible Markup Language file.

9. The method of claim 1, wherein the act of receiving comprises receiving data items through a graphical user interface design application.

10. A graphical user interface object material map rendering method, the method comprising:

receiving a graphical user interface object material map recipe file stored in a memory;

extracting a plurality of display time values from the file, wherein each display time value in the file is associated with a data item further associated with a display attribute for the graphical user interface object material map, at least one attribute having two or more associated display time values, each of the two or more display time values associated with a different operational display device resolution setting; and rendering, on a display device communicatively coupled to the memory, the graphical user interface object material map based on the extracted plurality of display time values.

11. The method of claim 10, wherein the act of receiving comprises receiving a hierarchically-ordered graphical user interface object material map recipe file.

12. The method of claim 11, wherein the act receiving a hierarchically-ordered graphical user interface object material map recipe file comprises receiving an eXtensible Markup Language file.

13. The method of claim 10, wherein the act of rendering is performed by an operating system level module.

14. A program storage device, readable by a programmable control device, comprising instructions stored thereon for causing the programmable control device to:

receive information to define a plurality of attribute-value pairs for a material map, each attribute-value pair comprising a display attribute and one or more data items, the material map for use with presenting a graphical user interface element on a display device;

associate each received data item with a corresponding display attribute, wherein at least one data item comprises two or more display time values for the associated display attribute, the two or more values corresponding to two or more run-time resolution settings of the display device and wherein the plurality of attribute-value pairs are sufficiently complete to permit the material map to be rendered on the display device using display time values corresponding to an operational resolution setting of the display device; and store the plurality of attribute-value pairs of display attributes and their associated data items in a file accessible by the programmable control device.

15. The program storage device of claim 14, wherein the instructions to receive comprise instruction to receive a flat file.

16. The program storage device of claim 14, wherein the instructions to receive comprise instruction to receive a hierarchically-ordered file.

17. The program storage device of claim 16, wherein the instructions to receive a hierarchically-ordered file comprise instruction to receive an eXtensible Markup Language file.

18. The program storage device of claim 14, wherein the instructions further comprise instructions to render the graphical user interface object material map.

19. A computer system comprising:

one or more programmable control devices; and a program storage device communicatively coupled to at least one of the one or more programmable control devices wherein the one or more programmable control devices are collectively configured to render a graphical user interface object material map by collectively performing the programmed acts of:

receiving a graphical user interface object material map recipe file stored on the program storage device;

extracting a plurality of display time values from the file, wherein each display time value in the file is associated with a data item further associated with a display attribute for the graphical user interface object material map, at least one attribute having two or more associated display time values, each of the two or more display time values associated with a different operational display device resolution setting; and rendering, on a display device communicatively coupled to the programmable control device, the graphical user interface object material map based on the extracted plurality of display time values.

20. A program storage device, readable by a programmable control device, comprising instructions stored thereon for causing the programmable control device to render a graphical user interface object material map by performing the programmed acts of:

receiving a graphical user interface object material map recipe file stored on a program storage device;

extracting a plurality of display time values from the file, wherein each display time value in the file is associated with a data item further associated with a display attribute for the graphical user interface object material map, at least one attribute having two or more associated display time values, each of the two or more display time values associated with a different operational display device resolution setting; and rendering, on a display device communicatively coupled to the programmable control device, the graphical user interface object material map based on the extracted plurality of display time values.

21. A computer system comprising:
one or more programmable control devices;
a display device communicatively coupled to at least one of the one or more programmable control devices; and
a program storage device communicatively coupled to at least one of the one or more programmable control devices wherein the one or more programmable control devices are collectively configured to present a graphical user interface element on the display device by collectively performing the programmed acts of:
receive information to define a plurality of attribute-value pairs for a material map, each attribute-value pair comprising a display attribute and one or more data items, the material map for use with presenting a graphical user interface element on a second display device;
associate each received data item with a corresponding display attribute,
wherein at least one data item comprises two or more display time values for the associated display attribute, the two or more values corresponding to two or more runtime resolution settings of the display device and
wherein the plurality of attribute-value pairs are sufficiently complete to permit the material map to be rendered on the second display device using display time values corresponding to an operational resolution setting of the second display device; and
store the plurality of attribute-value pairs of display attributes and their associated data items in a file accessible by the programmable control device.

* * * * *